W. J. BELCHER.
DRIVE CHAIN AND WHEEL THEREFOR.
APPLICATION FILED APR. 8, 1909.
959,046.
Patented May 24, 1910.
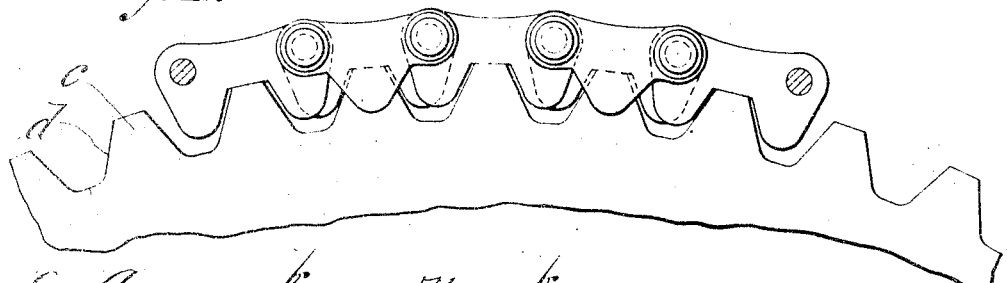
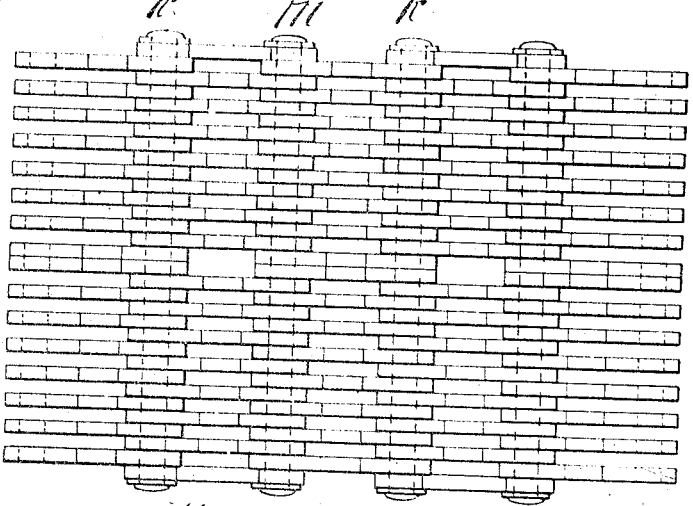
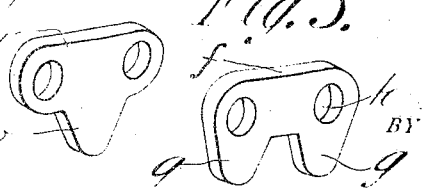
WITNESSES:
H. L. Sprague
Harry W. Bown
INVENTOR.
Warren J. Belcher
BY
Chapin & Co.
ATTORNEYS.

UNITED STATES PATENT OFFICE.

WARREN J. BELCHER, OF HARTFORD, CONNECTICUT, ASSIGNOR TO THE WHITNEY MANUFACTURING COMPANY, OF HARTFORD, CONNECTICUT, A CORPORATION OF CONNECTICUT.

DRIVE-CHAIN AND WHEEL THEREFOR.

959,046.

Specification of Letters Patent.   Patented May 24, 1910.

Application filed April 8, 1909.  Serial No. 488,716.

*To all whom it may concern:*

Be it known that I, WARREN J. BELCHER, a citizen of the United States of America, residing at Hartford, in the county of Hartford and State of Connecticut, have invented new and useful Improvements in Drive-Chains and Wheels Therefor, of which the following is a specification.

This invention relates to drive-chain construction and to the toothed wheels over which such chains are adapted to run.

The invention is fully illustrated in the accompanying drawings, in which,—

Figure 1 is a side elevation of a part of a toothed wheel showing the chain applied thereto. Fig. 2 is a plan view of the outside of a chain showing the manner of assembling the links. Fig. 3 is a view similar to Fig. 1 showing a toothed wheel of smaller diameter having teeth of the same height, same angle of sides, and same pitch as on the larger wheel. Fig. 4 is a perspective view, somewhat enlarged, of one of the side links to hold the chain on the toothed wheel, and Fig. 5 is a similar view of one of the driving links of the chain.

Heretofore, drive-chains of the type of the one forming the subject matter of this application, that is, chains which have a positive engagement with a toothed wheel, have generally been constructed with links having projections thereon to fit into the space between the teeth on the wheel.

When the chain links are made to fit in between the teeth of the wheel, a lessening of the diameter of the wheel results in a necessary change in the thickness of the teeth, that is, they must be made thinner; whereas, with the links supported on one tooth alone and out of contact with any other tooth, the teeth may all have the same cross-sectional area regardless of the diameter of the wheel. In this case, of course, the teeth being uniform, the angularity of the interdental spaces will vary as described farther on. This involves the use of a method in constructing a toothed wheel in which the teeth, properly spaced, all have the same height and the same cross-sectional area, the spaces between the teeth being disregarded, and in which, generally speaking, the angularity of the sides of these spaces between the teeth will vary as the radius of the wheel varies, though other factors also must be taken into consideration. This construction of the toothed wheel, however, forms no part of the present invention.

By the use of a chain and toothed wheel made as described, and shown in this application the contour of the tooth in cross section, that is, a section taken in the plane of the wheel, does not vary in wheels of different diameters, and the same link member can be used on wheels having varying diameters within a much greater range than has been possible heretofore, so far as I am aware. It follows therefore that with a chain made as described and shown herein, it may be applied to a straight rack or to a pinion having the least possible number of teeth without necessitating any change whatever in the form of the teeth of either rack or pinion.

In illustration of this, let it be assumed, for example, that we have two wheels—one having sixty-four teeth and the other eighteen,—both of course having the same pitch, each tooth being of the same height and the front and back sides of each tooth having the same angle relative to a radial line drawn through the center of the tooth. By comparing the spaces between the teeth of the sixty-four tooth wheel which may be assumed to be represented by Fig. 1, with the spaces in the 18 toothed wheel, represented in Fig. 3, it will be seen that the angularity of the back side of one tooth and the front side of the next relative to a radial line extending through the center of the space between two teeth, will be greater in the eighteen toothed wheel than in the sixty-four toothed wheel, which fact may be clearly demonstrated by the extension of the sides of two contiguous teeth in each wheel to the point of their intersection. It may therefore be stated as a general proposition that the angularity of the sides of the space between two contiguous teeth will increase as the radius of the wheel decreases.

That is to say, the bottom of the space between two teeth will be narrower in the smaller wheel than in the larger.

Referring to the drawings forming part of this application,— *a* indicates a toothed wheel adapted to receive a chain made according to this invention; and *b* a similar toothed wheel of smaller diameter.

*c* indicates the teeth of these wheels; *d* the angular sides of the teeth, and *e* the bottom of the space between two of the teeth *c*.

*f* indicates the driving links of the chain as a whole, and *g* the two end portions of the links which extend into the spaces between the teeth, the inner edge of each of said end portions *g* being finished off at an angle substantially equal to the angle of the sides *d* of the teeth. Holes *h* in each end of the links receive the pins *k* on which the links swivel.

The chain-retaining links, located along the sides of the chain, are indicated by *m*, and are provided on the lower side thereof with the V-shaped centrally disposed extensions *o*, and are supported on the pins *k* in such position that the parts *o* thereof will, when the chain is running over the toothed wheel, overlap the ends of the teeth *c* thus preventing any lateral motion of the chain during its movements. These side links *m* which retain the chain in position, do not, of themselves, constitute any part of the invention and are included in the application only as well known elements for the purpose described.

The links *f* of the chain are made as shown in the drawings to fit over and rest on the crowns of the teeth, and if the wheel *a* for example, be driven in the direction of the arrow, by means of the chain, the driving contact of the latter will be the forward edge of the rearmost depending portion *g* of the link, bearing against the rear side of the tooth *c*.

The link members are made of the shape described to permit them to fit over the ends of the teeth on which they rest, each link so supported on a tooth being out of contact with any part of another tooth. Thus when two link members seated on contiguous teeth are viewed from the side, as in Fig. 1, their contiguous ends will overlap and the depending portions *g* thereof will substantially fill the space between said teeth, and by reason of the location of the pins *k* constituting the pivotal points of these link members at a point nearer to the top of the teeth than to the bottom of the space between the teeth, the depending portions *g* of the link members will, as the chain is flexed, have a scissors-like movement, which permits them to adapt themselves to the varying angularity of the spaces between the teeth, which results from a variation in the radius of the wheel. These portions *g* however are always out of contact with the bottom of the spaces between the teeth.

By making the links of the drive-chain of the saddle form shown, it brings the holes *h* through which the pins *k* pass, directly over the projecting portions *g* of the links, in other words on that part of the link where there is the most metal; therefore, these holes may be so positioned as to provide the greatest possible cross sectional area between the holes *h* and the adjacent border of the links, and as a result of this characteristic, it has been possible to very nearly double the resistance to fracture of a chain constructed as herein described, as compared with a similarly constructed chain having links so made as to fit between two teeth, or in other words constructed substantially of the same form as the links *m*. A further and important advantage of the form of link shown in Fig. 5 is that it permits the pivot-pin *k* to be located very close to the periphery of the wheel, thereby reducing the stress on the links, and permits the disposition of the metal between the holes *h* of the link members in a straight line.

The chain is assembled in the usual manner, as shown in Fig. 2.

The construction of driving pulleys of the character described herein by the method herein set forth greatly simplifies and cheapens their construction and provides means whereby the same chain may be made to run perfectly over pulleys having widely varying diameters.

If the chain were constructed of link members like those shown in Fig. 4, to fit into the space between two teeth, this would not be possible for the reason that said space varies with every variation of the diameter of the wheel.

What I claim, is:—

1. A chain-driving mechanism consisting of a toothed wheel and a chain of pivotally connected links, said links having depending end portions whereby recesses are provided to fit the ends of the teeth, the link members being adapted to be seated astride of the teeth which they drive, the pivotal points of the links being located nearer to the ends of the teeth than to the bottom of the spaces between the teeth.

2. A chain consisting of pivotally connected links, the metal between the pivotal points of the link members being disposed in a straight line, the link members having end portions extending one side of said straight line to constitute a tooth receiving recess, each link member being adapted to be seated astride of the tooth which it drives.

3. A toothed wheel and a drive-chain of pivotally connected link members each adapted to be seated on the end of the tooth which it drives, out of contact with any other tooth, the pivotal points of the link members being nearer to the ends of the teeth than to the bottom of the spaces between the teeth.

4. A toothed wheel and a drive-chain of pivotally connected link members, each member being adapted to be seated astride of the tooth which it drives, the metal between the pivotal points of the chain being disposed in a straight line over the ends of the teeth.

WARREN J. BELCHER.

Witnesses:
K. I. CLEMONS,
HARRY W. BOWEN.